United States Patent
Howard et al.

(10) Patent No.: US 10,614,268 B1
(45) Date of Patent: Apr. 7, 2020

(54) AUTO-COMPLETE DESIGN FOR CONTENT-CREATING APPLICATIONS

(71) Applicant: InVisionApp Inc., New York, NY (US)

(72) Inventors: Caleb Howard, West Vancouver (CA); Robert Jay Reynolds, Vancouver (CA); Adam Martinez, Vancouver (CA); Bryn Wyka, Vancouver (CA)

(73) Assignee: InVisionApp Inc., New York, NY (US)

( * ) Notice: Subject to any disclaimer, the term of this patent is extended or adjusted under 35 U.S.C. 154(b) by 162 days.

(21) Appl. No.: 15/961,768

(22) Filed: Apr. 24, 2018

(51) Int. Cl.
| G06F 40/186 | (2020.01) |
| G06N 3/08 | (2006.01) |
| G06T 11/60 | (2006.01) |
| G06F 40/103 | (2020.01) |

(52) U.S. Cl.
CPC .......... *G06F 40/186* (2020.01); *G06F 40/103* (2020.01); *G06N 3/08* (2013.01); *G06T 11/60* (2013.01)

(58) Field of Classification Search
None
See application file for complete search history.

(56) References Cited

U.S. PATENT DOCUMENTS

| 10,192,321 B2 * | 1/2019 | Fang | G06T 11/001 |
| 10,311,366 B2 * | 6/2019 | Portilla | G06N 7/005 |
| 10,402,064 B1 * | 9/2019 | Al-Sallami | G06F 16/9535 |
| 2011/0061011 A1 * | 3/2011 | Hoguet | G06F 3/0482 715/769 |
| 2014/0006318 A1 * | 1/2014 | Xing | G06F 15/16 706/12 |
| 2016/0092406 A1 * | 3/2016 | Farouki | G06F 17/218 715/249 |
| 2017/0169340 A1 * | 6/2017 | Asente | G06F 17/50 |
| 2017/0193403 A1 * | 7/2017 | Iscoe | G06N 3/126 |
| 2018/0032626 A1 * | 2/2018 | Ben-Aharon | G06F 17/211 |
| 2018/0157386 A1 * | 6/2018 | Su | G06F 9/451 |
| 2018/0197066 A1 * | 7/2018 | Osotio | G06N 3/006 |
| 2019/0056715 A1 * | 2/2019 | Subramaniyan | G05B 19/4099 |
| 2019/0108159 A1 * | 4/2019 | Donahue | G06K 9/6268 |
| 2019/0251707 A1 * | 8/2019 | Gupta | G06N 3/08 |

* cited by examiner

Primary Examiner — Howard Cortes
(74) Attorney, Agent, or Firm — McDermott Will & Emery LLP

(57) ABSTRACT

A method includes providing a design template in a computer design application for a user in a client device is disclosed. The method includes assigning user-designs to initial points in an embedded classification chart based on the user-design and a learning model, presenting a design proposal to the user based on a first design type in the embedded classification chart that is close to the initial point, and receiving an augmented design from the user based on the design proposal. The method includes assigning a second point in the embedded classification chart to the augmented design and storing the augmented design with a group of collected designs in a design database, and presenting a second design proposal to the user based on a second design type in the embedded classification chart. The method includes receiving a final user-design from the user and storing the final user-design in the design database.

20 Claims, 11 Drawing Sheets

AUTO-COMPLETE DESIGN FOR CONTENT-CREATING APPLICATIONS

BACKGROUND

Field

The present disclosure generally relates to content creating applications that provide tools for users to create enhanced designs. More specifically, the present disclosure relates to devices and systems for providing suggested design modifications to improve design quality and increase design efficiency for a user of the content creating application.

Description of the Related Art

In content-rich applications involving heavy graphic design, the competitive edge and marketability of a product (e.g., videogames, web portals, and other multimedia applications) may reside strongly on design features. Accordingly, many applications include tools that enable a designer to attempt to obtain more advantage of a graphic impact of a product. There are currently existing models which attempt to classify presented shapes into a limited and fixed set of categories built from limited and curated data sets. However, no tools for production are currently available that apply machine learning techniques in their full capability to efficiently maximize the potential of a designer.

SUMMARY

In one embodiment of the present disclosure, a computer-implemented method is described for providing a design template in a computer design application for a user in a client device. The computer-implemented method includes assigning an initial user-design to an initial point in an embedded classification chart based on the initial user-design and a learning model, presenting a design proposal to the user based on a first design type in the embedded classification chart that is close to the initial point, receiving an augmented design from the user based on the design proposal, assigning a second point in the embedded classification chart to the augmented design, and storing the augmented design with a group of collected designs in a design database. The computer-implemented method also includes presenting a second design proposal to the user based on a second design type in the embedded classification chart, receiving a final user-design from the user, and storing the final user-design in the design database.

According to one embodiment, a system is described that includes one or more processors and a memory coupled to the one or more processors, the memory including instructions that, when executed by the one or more processors, cause the one or more processors to provide a design template in a computer design application for a user in a client device, to assign an initial user-design to an initial point in an embedded classification chart based on the initial user-design and a learning model, and to present a design proposal to the user based on a first design type in the embedded classification chart that is close to the initial point. The one or more processors further execute instructions to receive an augmented design from the user based on the design proposal, to assign a second point in the embedded classification chart to the augmented design, and to store the augmented design with a group of collected designs in a design database. The one or more processors also execute instructions to present a second design proposal to the user based on a second design type in the embedded classification chart, and to receive a final user-design from the user. The one or more processors further execute instructions to store the final user-design in the design database.

According to one embodiment, a non-transitory, computer readable medium is described that includes instructions, which when executed by one or more processors, cause a computer to perform a method for providing a design template in a computer design application for a user in a client device. The method also includes assigning an initial user-design to an initial point in an embedded classification chart based on the initial user-design and a learning model, presenting a design proposal to the user based on a first design type in the embedded classification chart that is close to the initial point, receiving an augmented design from the user based on the design proposal, assigning a second point in the embedded classification chart to the augmented design, and storing the augmented design with a group of collected designs in a design database. The method also includes presenting a second design proposal to the user based on a second design type in the embedded classification chart, receiving a final user-design from the user and storing the final user-design in the design database.

In yet other embodiment, a system is described that includes a means for storing commands and a means for executing the commands causing the system to perform a method that includes providing a design template in a computer design application for a user in a client device. The method also includes assigning an initial user-design to an initial point in an embedded classification chart based on the initial user-design and a learning model, presenting a design proposal to the user based on a first design type in the embedded classification chart that is close to the initial point, and receiving an augmented design from the user based on the design proposal, assigning a second point in the embedded classification chart to the augmented design, and storing the augmented design with a group of collected designs in a design database. The method also includes presenting a second design proposal to the user based on a second design type in the embedded classification chart, receiving a final user-design from the user, and storing the final user-design in the design database.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
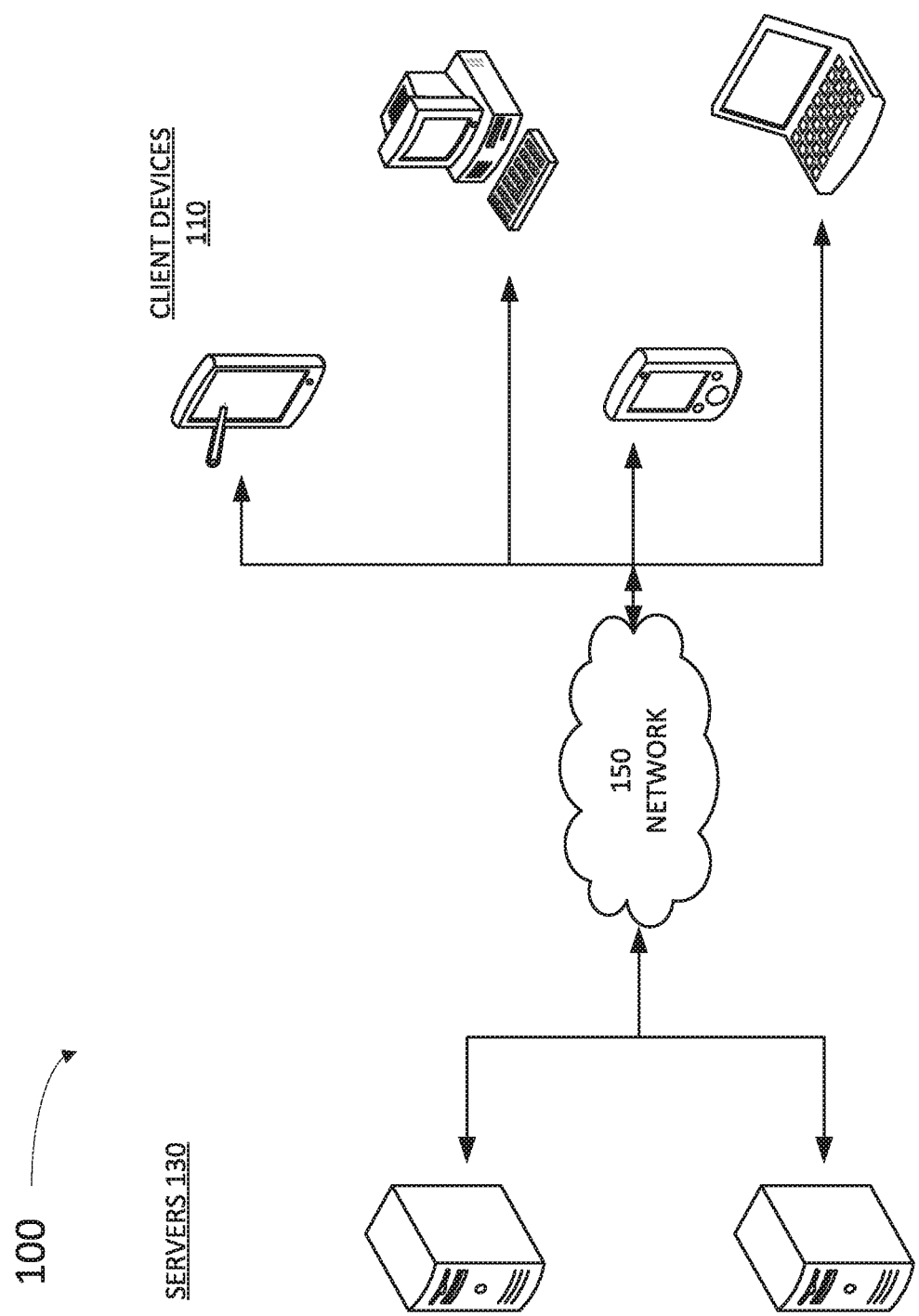
FIG. 1 illustrates an example architecture suitable for a content-creating application, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "graphic design" may be used, for example, in reference to a digital file that is composed of one or more media elements of different types (text, image, video, audio, and the like). A graphic design can be a single picture or a single video file, or a document template that changes through time (e.g., an animated feature, a pop up frame, and the like).

The present disclosure relates to systems and methods for creating content-rich user applications including multimedia files embedded in graphic designs for high-end applications such as gaming, simulation, and portal templates.

Embodiments as disclosed herein provide a solution to a problem arising in the realm of computer technology, which is to provide tools that efficiently enable graphic designers to exploit background knowledge and combine it with a personalized, artistic style to create a unique graphic design surpassing performance and style of current designs. In some embodiments, a tool provides designers and artists a predictive model to anticipate their artistic choices as they are working on an initial design. To achieve this, some embodiments implement unsupervised and semi-supervised machine learning algorithms trained on data available in a wide ranging database that includes one or more artistic styles. These improvements save processor load (e.g., increase bandwidth) as the user is not pressed to change design constantly.

Embodiments as disclosed herein provide real-time support for a designer while a project is in progress, by recognizing common patterns across multiple designs in a design database. This provides the advantage for a designer to more quickly turn a rough sketch or an initial design into an augmented design and a final design. Accordingly, some embodiments are configured to outline a design path for a designer, with multiple design proposals aligned along an increasingly detailed stylistic layout. Further, embodiments as disclosed herein may turn a relatively inexperienced team of designers, with limited design resources, into a highly competitive team capable of resolving the complex tasks currently confronted by the industry.

Embodiments as disclosed herein address limitations of existing technology in their inability to cope with very large datasets such as are present from a very large user base of professional designers collaborating online. Some embodiments address the failure of prior technology to continually refine a model using data aggregated on the fly from such a user base. Thus, embodiments as disclosed herein address the failure of prior technologies to continually refine a hierarchical set of categories.

The proposed solution further provides improvements to the functioning of the computer itself, because it substantially reduces the time a designer spends working on a particular project, thus reducing processing time and increasing processor bandwidth. Moreover, some embodiments improve the ergonomic function of a computer by considering a heat map overlay illustrating hot spots of user concentration, and providing design proposals that tend to result in a more homogenous use of a computer display and that is more ergonomically comfortable for the user.

Example System Architecture

FIG. 1 illustrates an example architecture 100 for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. For purposes of load balancing, multiple servers 130 can host memories including instructions to one or more processors, and multiple servers 130 can host a design history log and the document database.

Servers 130 may include any device having an appropriate processor, memory, and communications capability for hosting the design history log, the image database, and a design engine. The design engine may be accessible by various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the design engine and the history log on one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
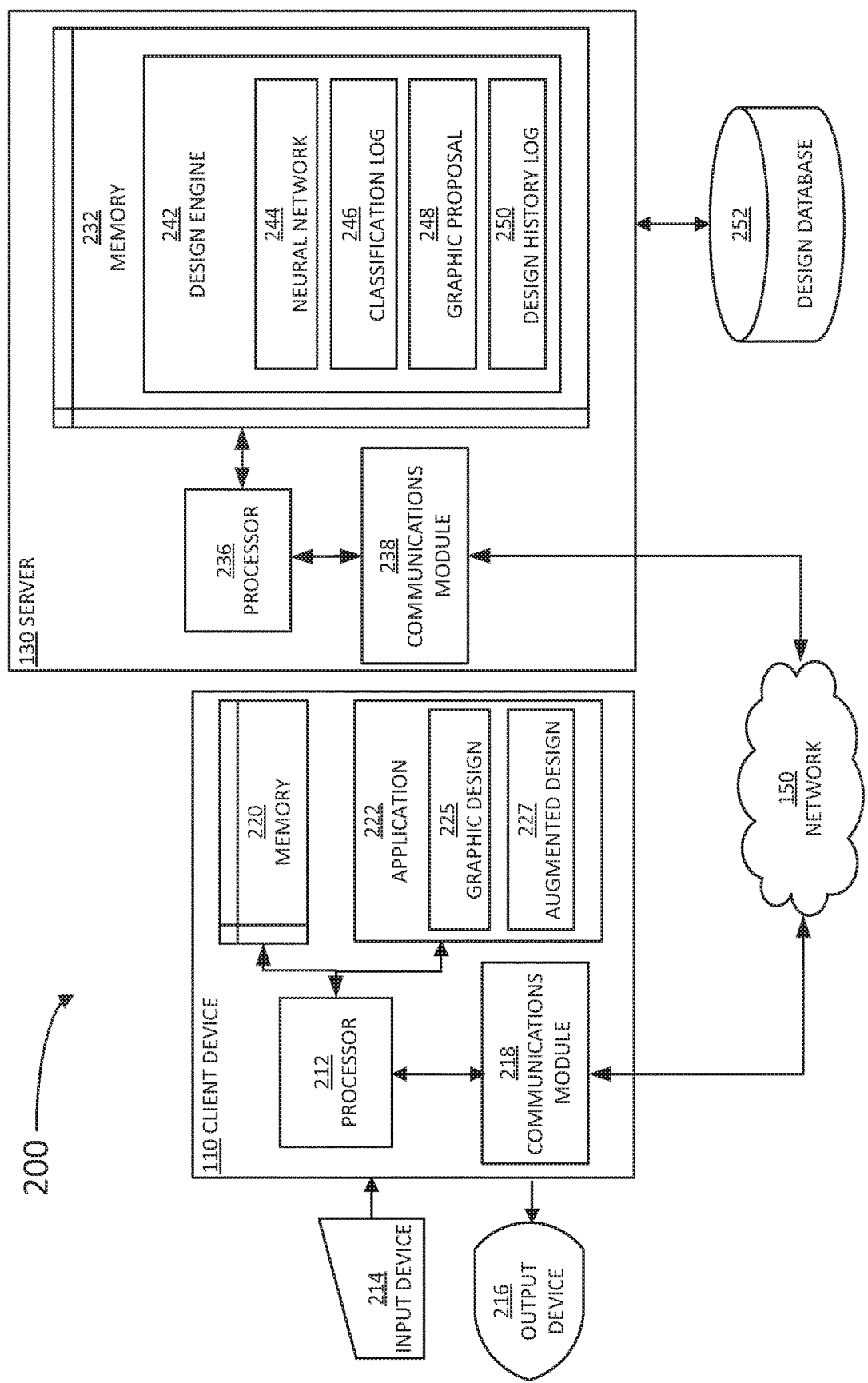
FIG. 2 is a block diagram illustrating an example server and client from the architecture of FIG. 1, according to certain aspects of the disclosure.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices over the network. Communications modules 218 and 238 can be, for example, modems or Ethernet cards.

Server 130 includes a memory 232, a processor 236, and communications module 238. Processor 236 is configured to execute instructions, such as instructions physically coded into processor 236, instructions received from software in memory 232, or a combination of both. Memory 232 includes a design engine 242 for synchronizing and updating versions of a graphic proposal 248 for the user into classification log 246, and saving the updated graphic proposal 248 in a design database 252. A user may access design engine 242 through an application 222 or a web browser installed in client device 110. Accordingly, application 222 may be installed by server 130 and perform scripts and other routines provided by server 130. Further, in some embodiments, application 222 may be a collaborative application such that multiple client devices 110 may access and edit a graphic design 225. A graphic proposal 248 for graphic design 225 is stored in memory 232 of server 130, more specifically in design engine 242. Server 130 provides graphic proposal 248 to the user through application 222. As a result, the user may modify graphic design 225 into an augmented design 227. Execution of application 222 and activation of augmented design 227 may be controlled by a processor 212 in client device 110.

Graphic proposal 248 is a set of operations representing a change or modification to graphic design 225. In some embodiments, client device 110 may be configured to receive voice commands from the user as input for application 222, via a microphone. Moreover, in some embodiments application 222 may receive a video feed capturing user gestures while the user interacts with application 222 to create graphic design 225. An output device 216 may include a display, a speaker, an antenna, or any combination of the above, configured to provide the user with a visual, audio, or perceptive rendition of graphic design 225. Graphic proposal 248 may include a set of operations representing a change in the document that encompasses a clear context of user intent or action.

In some embodiments, graphic proposal 248 includes the context of the user intent when changing or modifying graphic design 225. In that regard, graphic proposal 248 may include a cluster of actions by the user that represent a unity of purpose for modifying the document. Accordingly, in some embodiments graphic proposal 248 includes multiple document actions clustered together in an atomic structure that may be undone as a whole by a remote user.

In some embodiments, memory 232 stores a neural network 244 that includes multiple graphic proposals 248 for modifying graphic design 225. Graphic proposals 248 in neural network 244 are generated by neural network 244 using a classification log 246 that includes an embedded classification chart. The user of client device 110 receives graphic proposal 248 from server 130 and, based on graphic proposal 248, decides to modify (or not) graphic design 225 into augmented design 227, which is then transmitted back to design engine 242 in server 130. At this point, design engine 242 may store augmented design 227 into a design history log 250, for further training and updating of neural network 244 and classification log 246. Design history log 250, design engine 242, and design database 252 may be part of the same memory 232 in server 130. In some embodiments, design engine 242 and design database 252 may be hosted in a different server that is accessible by server 130.

Figure 3:
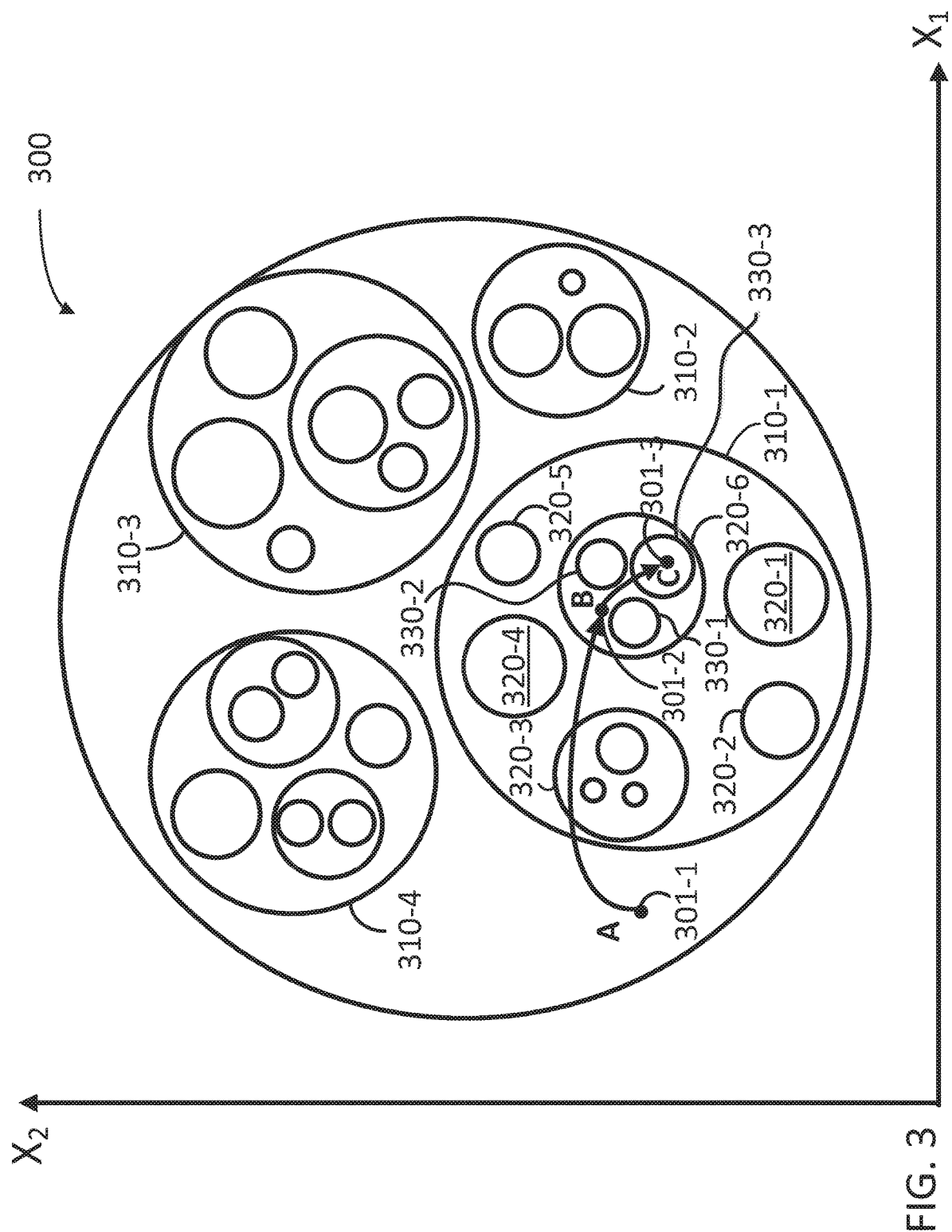
FIG. 3 illustrates an embedded classification chart based on a hierarchy map for auto-complete design in a content-creating application, according to some embodiments.

FIG. 3 illustrates an embedded classification chart 300 based on a hierarchy map for an auto-complete design in a content-creating application, according to some embodiments. Chart 300 includes two classification coordinates $X_1$ and $X_2$ that serve to locate graphic designs by a user of a client device on a multidimensional space (e.g., graphic design 225 in client device 110). The user may be running an application in the client device to create a graphic design, the application being hosted by a server over a network (e.g., application 222, graphic design 225, and network 150). Accordingly, chart 300 may be created by and stored in a design engine which is part of a memory of the server (e.g., memory 232, and design engine 242). In some embodiments, the selection of classification coordinates $X_1$ and $X_2$ and a mapping of a graphic design into embedded classification chart 300 is carried out by a nonlinear, machine-learning algorithm stored in the memory of the server (e.g., neural network 244). In some embodiments, the machine-learning algorithm may include multiple stacked auto-encoders applied to a hierarchy of structure elements (e.g., design types) in an embedded graphic design. Stacked auto-encoders may include a series of layers of auto-encoders, wherein each layer pulls features and values from the previous layer to build a more abstract construction.

Further, while embedded classification chart 300 shows only two classification coordinates, some embodiments may include many more dimensions, e.g., three, ten, one hundred, or even more dimensions. Accordingly, the design engine is configured to associate a point in embedded classification chart 300 for each graphic design provided by the user. Moreover, the design engine is able to determine distances between two points in embedded classification chart 300 as the cosine distance between the two points (e.g. a Cartesian distance). A Cartesian distance between points 301-1 (A) and 301-2 (B) in embedded classification chart 300 may be defined as:

$$D_{AB} = \sqrt{(X_1^A - X_1^B)^2 + (X_2^A - X_2^B)^2} \qquad (1)$$

The user provides an initial user design through the application in the client device. The design engine uses the initial design to determine an initial point 301-1 (A). An initial user design may include, e.g., a login screen with the word "account" placed in a prominent portion of a screen. Design types 310-1, 310-2, 310-3, and 310-4 (collectively referred to, hereinafter, as "design types 310") may be sections of embedded classification chart 300 defining a specific cluster of designs associated by some graphic feature, or a compositional feature identified by the design engine. Further, embedded classification chart 300 may include, for each design type 310 (e.g., design type 310-1), a further sub-classification of design types 320-1, 320-2, 320-3, 320-4, 320-5, and 320-6 (collectively referred to, hereinafter, as "design types 320"). Design types 320 may include a more refined level of classification based on the same criteria used to select design types 310, or including a further classification criterion that distinguishes different designs within a same design type 310. For example, the initial design mapped onto initial point 301-1 (A) may include a rectangle and the classification coordinates $X_1$ and $X_2$ design engine include at least one of a scale position, color, or any other features of the design that are potential design options. Further, design types 310, 320 may include a rule based on heuristic application of the machine learning algorithm or on an ad-hoc application of a design style (e.g., the "rule of thirds") or other esthetically pleasing design rules.

Based on the distance to each of design types 310, the design engine may determine that a design type 310-1 is the closest in style to initial point 301-1. The design engine thus determines what the user may want to do and provides suggestions, based on similarities to initial point 301-1 (A). The user may choose to follow the suggestion or not, or select one suggestion from multiple suggestions. Accordingly, the design engine may present design types 320 to the user, as a graphic proposal 248. An intermediate point 301-2 (B) corresponds to an augmented design (e.g., augmented design 227) that the user has chosen or modified upon being presented with design types 310 by the server. In a second iteration, the design engine may present a design proposal from design types 330-1, 330-2, and 330-3 (hereinafter, collectively referred to as "design types 330"). The user may select a final design corresponding to point 301-3 (C) within a design type 330-3. In some embodiments, the design engine may store intermediate point 301-2 (B) and/or final point 301-3 (C) in the memory of the server (e.g., classification log 246) to further refine the prediction model (e.g., neural network 244).

Embodiments of embedded classification chart 300 may include classifying shapes according to a growing and large set of categories. Further, design types 310, 320, and 330 may include a nested set of varying dimensionalities, wherein design types 330 are a subset of no greater dimensionality than design types 320, and design types 320 are a subset of no greater dimensionality as design types 310. Accordingly, design types 310, 320 and 330 classify shapes into a hierarchical set of categories to refine the prediction of increasingly granular subcategories as more detail is added by the user to the current design. Embedded classification chart 300 is scalable and robust to enable work within the context of the very-large and un-curated datasets aggregated in the design database. In some embodiments, the machine-learning algorithm feeds dynamic filters on each of classification coordinates $X_1$ and $X_2$ to refine and constrain embedded classification chart 300 and provide greater speed and accuracy of the design experience to a user.

Figure 4:
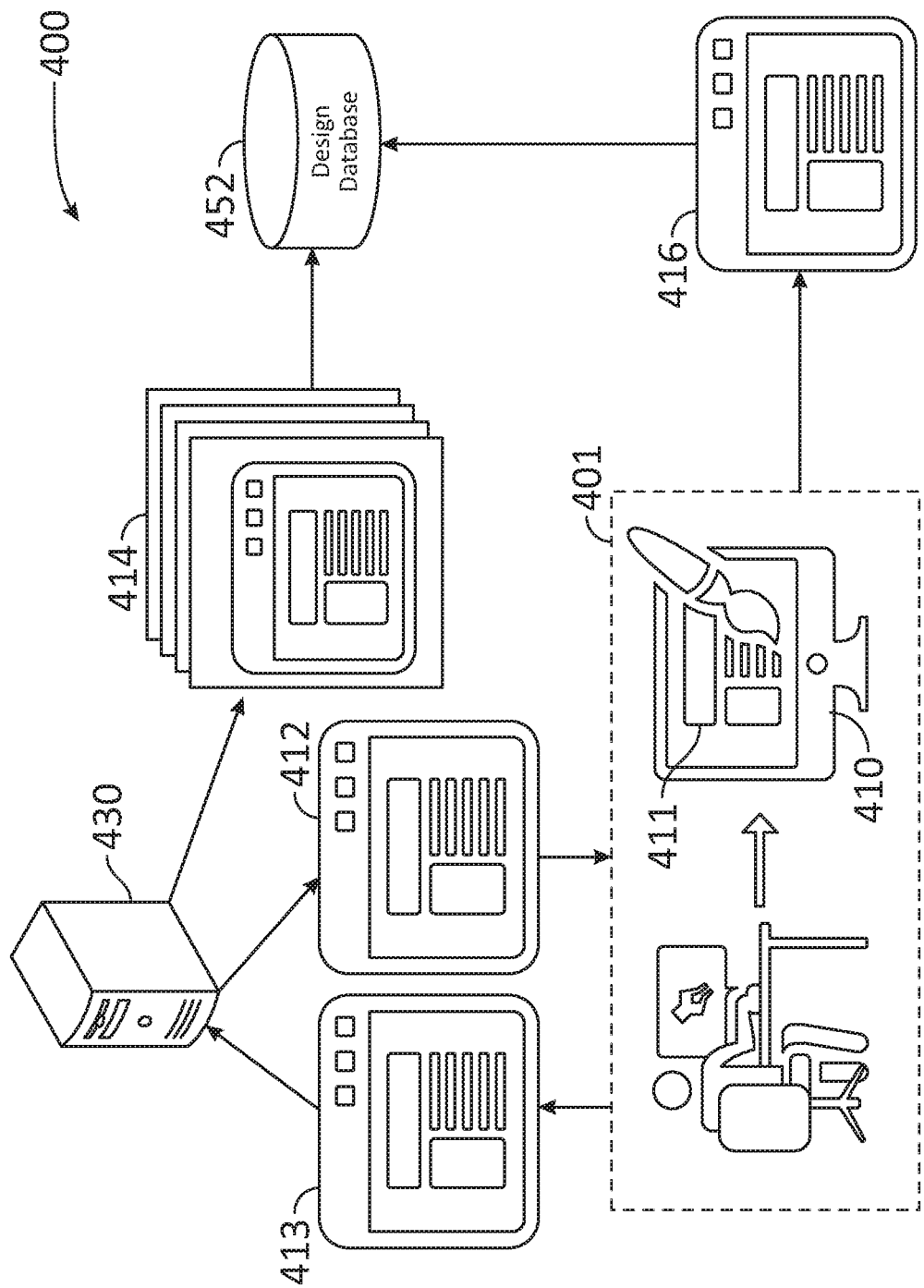
FIG. 4 illustrates a communication between a client device and a server for receiving a suggested design and creating an augmented design, according to some embodiments.

FIG. 4 illustrates a communication 400 between a user 401 using a client device 410 and a server 430 to complete a final design 416, according to some embodiments. Server 430 provides a design proposal 412 to user 401 based on an initial design 411 created by user 401. Initial design 411 may be a rough sketch in which user 401 has spent relatively little time and effort. Server 430 monitors, in real time, the development of initial design 411 and maps the features of initial design 411 to existing templates as an initial point in an embedded classification chart (e.g., initial point 301-1 (A) in embedded classification chart 300). Factors to consider by server 430 when creating design proposal 412 may include a period of time lapsed before receiving a user input into any field of the application, an existing content in the document, a context of global database system, an identity of user 401, or of an organization to which user 401 is affiliated, and general design preferences.

User 401 creates, based on the design proposal, an augmented design 413. User 401 then provides augmented design 413 to server 430, which may collect multiple augmented designs 413 (e.g., from user 401 or different users) in a series of collected designs 414. A learned model in server 430 (e.g., neural network 244) may be further trained using collected designs 414, which may be stored in design database 452 (e.g., design database 252). The learned model in server 430 may include a neural network (e.g., neural network 244 in server 130) that applies a semi-supervised learning model, or an unsupervised learning model to collected designs 414 in design database 452.

Figure 5:
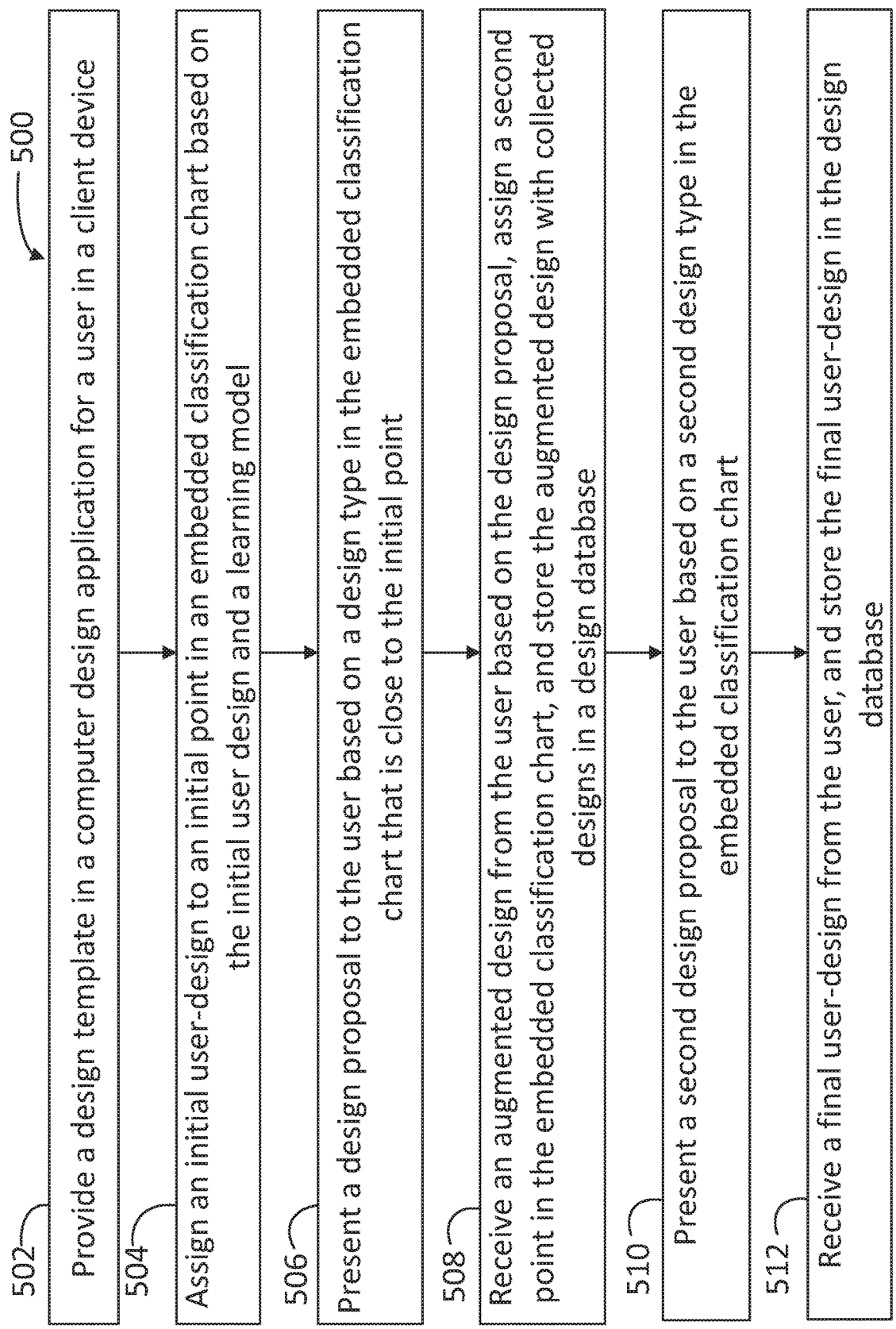
FIG. 5 is a flow chart illustrating steps in a method for handling a content-creating application hosted by a server, according to some embodiments.

FIG. 5 is a flow chart illustrating steps in a method for handling a content-creating application hosted by a server, according to some embodiments. Method 500 may be performed, at least partially, by a user with any one of a plurality of client devices (e.g., any one of servers 130 and any one of client devices 110), and communicating with any one of a plurality of network servers hosting a design engine, through a communications module (e.g., design engine 242, and communications modules 218 and 238). The design engine may include a neural network, a classification log, and a design history log, and an embedded classification chart formed by the neural network (e.g., neural network 244, classification log 246, design history log 250, and embedded classification chart 300). The client devices may be handled by a user, wherein the user may be registered to a private account with the server, or may be a visitor to the server website or logged in a server application installed in the client device (e.g., application 222). Further, the client devices may include input and output devices, such as video cameras, microphones, speakers, mouse, pointers, touch screen devices, and the like (e.g., input device 214 and output device 216). At least some of the steps in method 500 may be performed by a computer having a processor executing commands stored in a memory of the computer (e.g., processors 212 and 236, memories 220 and 232). Further, steps as disclosed in method 500 may include retrieving, editing, and/or storing files in a database that is part of, or is communicably coupled to, the computer (e.g., database 252), using, inter alia, the communications module. Methods consistent with the present disclosure may include at least some, but not all of, the steps illustrated in method 500, performed in a different sequence. Furthermore, methods consistent with the present disclosure may include at least two or more steps as in method 500 performed overlapping in time, or almost simultaneously.

Step 502 includes providing a design template in a computer design application for a user in a client device.

Step 504 includes assigning an initial user-design to an initial point in an embedded classification chart based on the initial user-design and a learning model. In some embodiments the learning model is a semi-supervised learning model, and step 504 includes determining at least one of multiple coordinates of the initial point according to a pre-selected design outcome. In some embodiments, the learning model is an unsupervised learning model, and step 504 further includes determining at least one of multiple coordinates of the initial point according to a classification of multiple prior designs stored in the design database. In some embodiments, step 504 further includes adjusting the embedded classification chart based on the final user-design in the design database.

Step 506 includes presenting a design proposal to the user based on a first design type in the embedded classification chart that is close to the initial point. In some embodiments, step 506 includes presenting a design proposal from a subclass of the first design type in the embedded classification chart.

Step 508 includes receiving an augmented design from the user based on the design proposal, assigning a second point in the embedded classification chart to the augmented design, and storing the augmented design with a group of collected designs in a design database.

Step 510 presenting a second design proposal to the user based on a second design type in the embedded classification chart. In some embodiments, the second design type is selected based on the augmented design from the user and step 510 includes selecting a design proposal from a subclass of the second design type in the embedded classification chart.

Step 512 includes receiving a final user-design from the user; and storing the final user-design in the design database. In some embodiments, step 512 further includes defining a classification type for the embedded classification chart based on a personalized design style, and presenting the design proposal to the user comprises receiving, from the user, a desired bias of the design proposal towards the personalized design style.

Figure 6A:
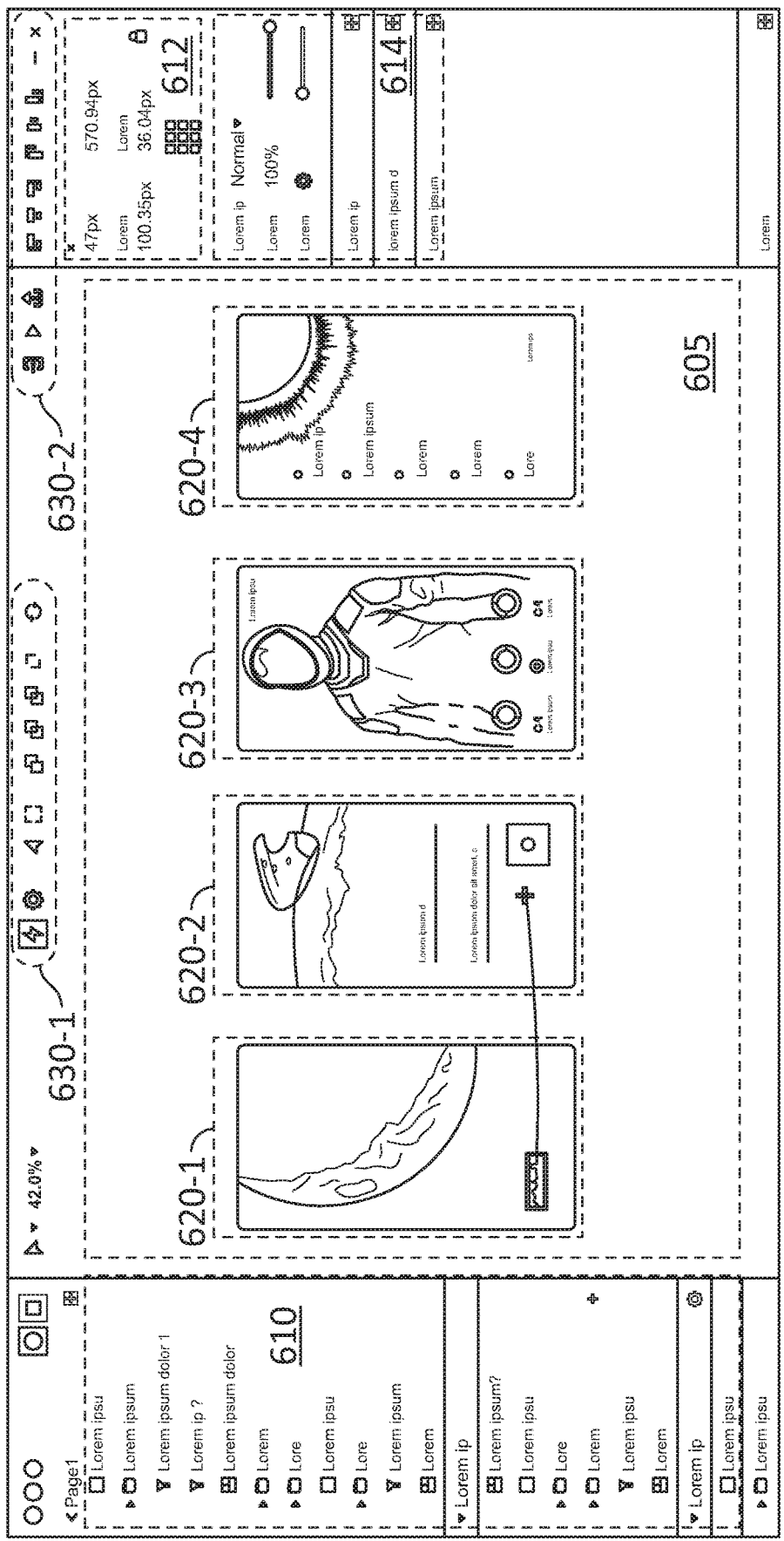
FIG. 6A is a screen shot of a template for a content-creating application, according to some embodiments.

FIG. 6A is a screen shot of a template 600 for a content-creating application, according to some embodiments. Template 600 includes a menu bar 610 that lists multiple actions that a user can take for editing a document or a portal 605 that includes several panels 620-1, 620-2, 620-3, and 620-4 (hereinafter, collectively referred to as "panels 620"). Panels 620 may be portions of an animation sequence in a content-rich file that the user is preparing (e.g., for a game or other multimedia application).

Template 600 may also include tool sets 630-1 and 630-2 (hereinafter, collectively referred to as "tool sets 630") that the user can manipulate to edit one or more of panels 620. Fields 612 and 614 may include further tool sets and resources accessible to the user for modifying, editing, testing and adjusting each of panels 620 and their inter-relation (e.g., through an animated sequence, and the like). For example, fields 612 and 614 may include dials and sliding scales that a user may implement for fine-tuning different pre-selected design types (e.g., design types 310, 320, and 330). Accordingly, the user may have the choice to combine two or more different design types with a pre-selected degree of relevance.

Figure 6B:
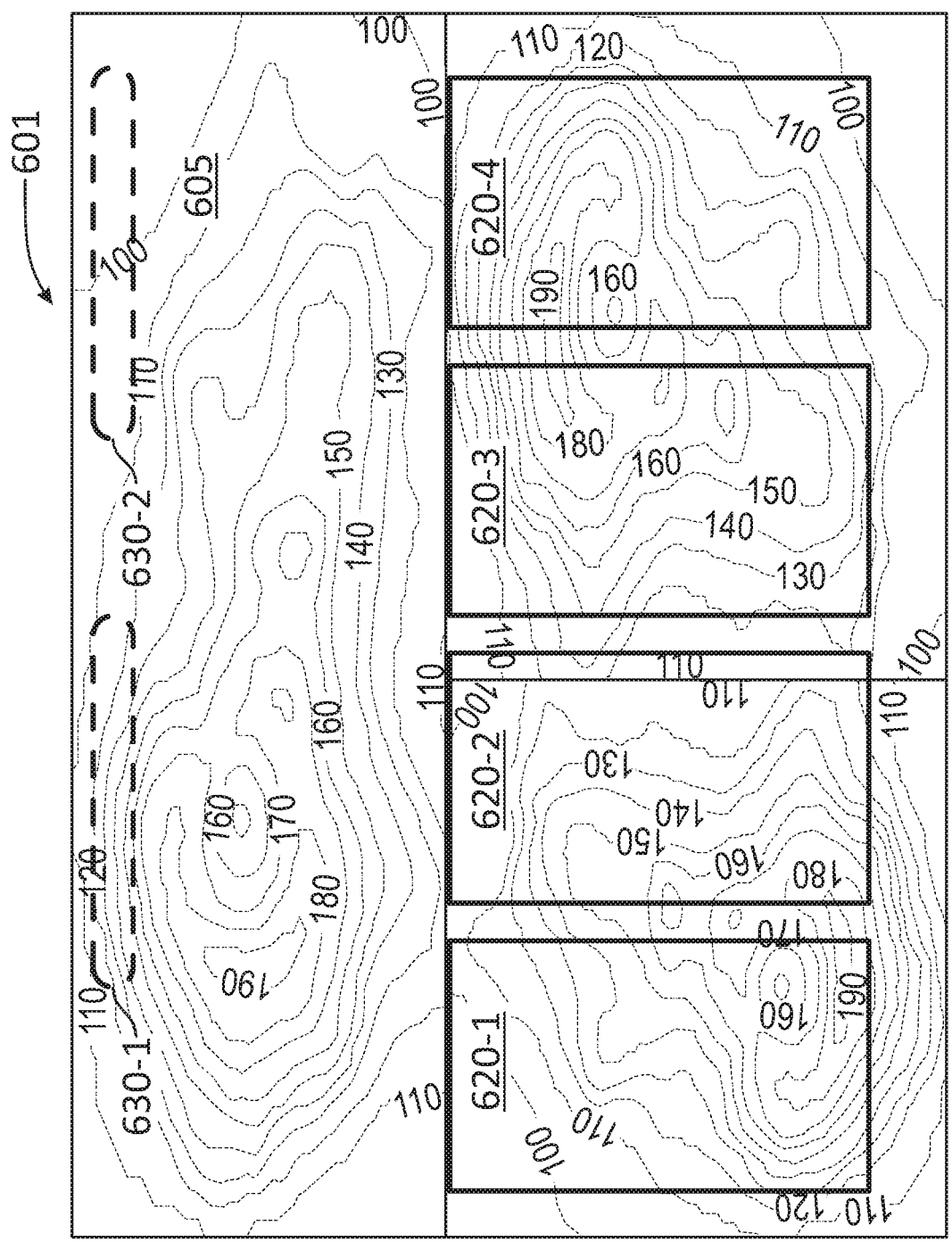
FIG. 6B illustrates a heat map overlaid on a template for a content-creating application, according to some embodiments.

FIG. 6B illustrates a heat map 601 overlaid on a template (e.g., template 600) for a content-creating application including portal 605, according to some embodiments. Accordingly, heat map 601 indicates a degree of usage by users of template 600, including tool sets 630, and panels 620. Heat map 601 may include usage data accrued for multiple users over an extended period of time, and may indicate areas of the template that a designer may desire to improve, or to focus on, while creating a new design or modifying the template of the content-rich application. For example, in some embodiments, heat map 601 may indicate the system to present a graphic proposal (e.g., graphic proposal 248) that includes a wider spacing between panels 620, or a larger area for tool sets 630, or even a combined tool set, based on the accrued usage.

Figure 7:
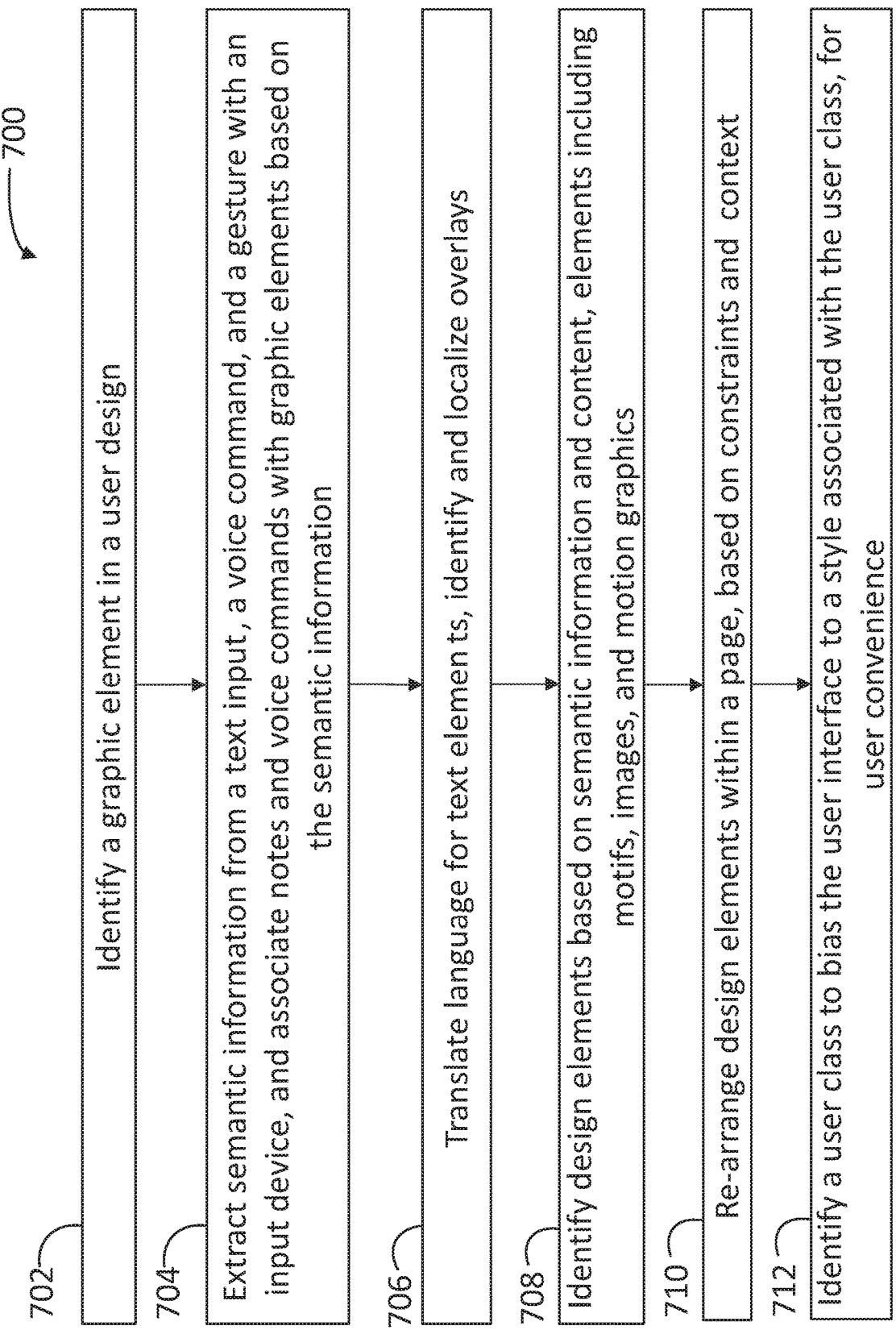
FIG. 7 is a flow chart illustrating steps in a method for creating an augmented design with a content-creating application hosted by a server, according to some embodiments.

FIG. 7 is a flow chart illustrating steps in a method 700 for creating an augmented design with a content-creating application hosted by a server, according to some embodiments. Method 700 may be performed, at least partially, by a user with any one of a plurality of client devices (e.g., any one of servers 130 and any one of client devices 110), and communicating with any one of a plurality of network servers hosting a design engine, through a communications module (e.g., design engine 242, and communications modules 218 and 238). The design engine may include a neural network, a classification log, and a design history log, and an embedded classification chart formed by the neural network (e.g., neural network 244, classification log 246, design history log 250, and embedded classification chart 300). The client devices may be handled by a user, wherein the user may be registered to a private account with the server, or may be a visitor to the server website or logged in a server application installed in the client device (e.g., application 222). Further, the client devices may include input and output devices, such as video cameras, microphones, speakers, mouse, pointers, touch screen devices, and the like (e.g., input device 214 and output device 216). At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer (e.g., database 252), using, inter alia, the communications module. Methods consistent with the present disclosure may include at least some, but not all of, the steps illustrated in method 700, performed in a different sequence. Furthermore, methods consistent with the present disclosure may include at least two or more steps as in method 700 performed overlapping in time, or almost simultaneously.

Step 702 includes identifying a graphic element in a user design. In some embodiments, step 702 includes identifying a shape, a contour, a size, and a color or fill texture of the graphic element in the user design. Further, in some embodiments step 702 may include associating the user design with a point in the embedded classification chart.

Step 704 includes extracting semantic information from a text input, a voice command, and a gesture with an input device, and associating the text input and the voice command with graphic elements based on the semantic information. For example, in some embodiments step 704 includes associating a panel in a template with a text message included in the panel (e.g., any one of panels 620 in template 600), or with a sequence command to move the panel across the template upon a user interaction.

Step 706 includes translating language for text elements, and identifying and localizing overlays. In some embodiments, step 706 may include identifying an overlapping between one or more panels in the template, e.g., in an animated sequence.

Step 708 includes identifying design element based on semantic information and content, elements including motifs, images, and motion graphics. In some embodiments, step 708 may include selecting the design element from a design type that is close to a point in the embedded classification chart corresponding to the initial user design.

Step 710 includes re-arranging design elements within a page, based on constraints and context. In some embodiments, step 710 may include providing the user a graphic proposal including the re-arranged design elements, wherein the constraints and context are selected from a design type in the embedded classification chart.

Step 712 includes identifying a user class to bias the user interface to a style associated with the user class, for user convenience. In some embodiments, step 712 includes receiving from the user a setting for a sliding scale or a dial in a template for the graphic design application.

Figure 8:
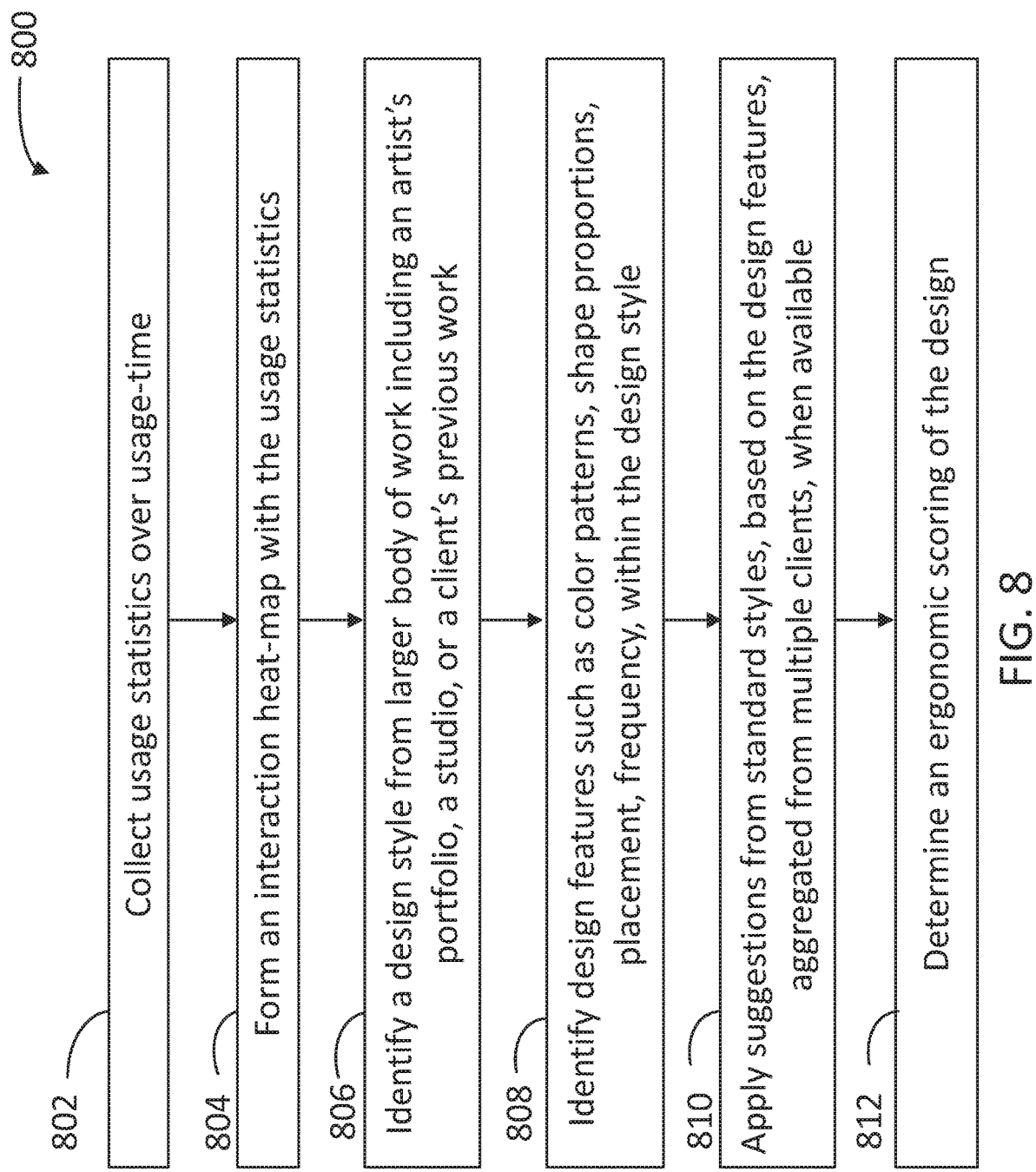
FIG. 8 is a flow chart illustrating steps in a method for creating an augmented design with a content-creating application hosted by a server, according to some embodiments.

FIG. 8 is a flow chart illustrating steps in a method 800 for creating an augmented design with a content-creating application hosted by a server, according to some embodiments. Method 800 may be performed, at least partially, by a user with any one of a plurality of client devices (e.g., any one of servers 130 and any one of client devices 110), and communicating with any one of a plurality of network servers hosting a design engine, through a communications module (e.g., design engine 242, and communications modules 218 and 238). The design engine may include a neural network, a classification log, and a design history log, and an embedded classification chart formed by the neural network (e.g., neural network 244, classification log 246, design history log 250, and embedded classification chart 300). The client devices may be handled by a user, wherein the user may be registered to a private account with the server, or may be a visitor to the server website or logged in a server application installed in the client device, (e.g., application 222). Further, the client devices may include input and output devices, such as video cameras, microphones, speakers, mouse, pointers, touch screen devices, and the like (e.g., input device 214 and output device 216). At least some of the steps in method 800 may be performed by a computer having a processor executing commands stored in a memory of the computer (e.g., processors 212 and 236, memories 220 and 232). Further, steps as disclosed in method 800 may include retrieving, editing, and/or storing files in a database that is part of, or is communicably coupled to, the computer (e.g., database 252), using, inter alia, the communications module. Methods consistent with the present disclosure may include at least some, but not all of, the steps illustrated in method 800, performed in a different sequence. Furthermore, methods consistent with the present disclosure may include at least two or more steps as in method 800 performed overlapping in time, or almost simultaneously.

Step 802 includes collecting usage statistics over usage-time. In some embodiments, step 802 may include collecting data of the movement of a user input device across a screen in the client device used by the user to run the application.

Step 804 includes forming an interaction heat-map with the usage statistics. In some embodiments, step 804 includes overlaying the interaction heat-map over a template for the application.

Step 806 includes identifying a design style from a larger body of work, including an artist's portfolio, studio, or a client's previous work. In some embodiments, step 806 includes assigning multiple data points in the embedded classification chart with each of multiple designs in the larger body of work. In some embodiments, step 806 includes selecting the design style according to the proximity of the data points in the embedded classification chart.

Step 808 includes identifying design features such as color patterns, shape proportions, placement, and placement frequency of an object, within the design style.

Step 810 includes applying suggestions from standard styles, based on the design features, aggregated from multiple clients, when available. In some embodiments, step 810 may include receiving from a sliding scale or a dial in the application a user selection of the standard style, and a degree of applicability of the standard style in the suggestion. In some embodiments, step 810 may include selecting the degree of applicability of the standard style as a distance to a center of a cluster of points associated with the standard style in the embedded classification chart.

Step 812 includes determining an ergonomic scoring of the design. In some embodiments, step 812 may include using the heat-map to associate a hand posturing of a designer while creating the graphic design, and determine the scoring according to the inhomogeneity of the heat-map.

Figure 9:
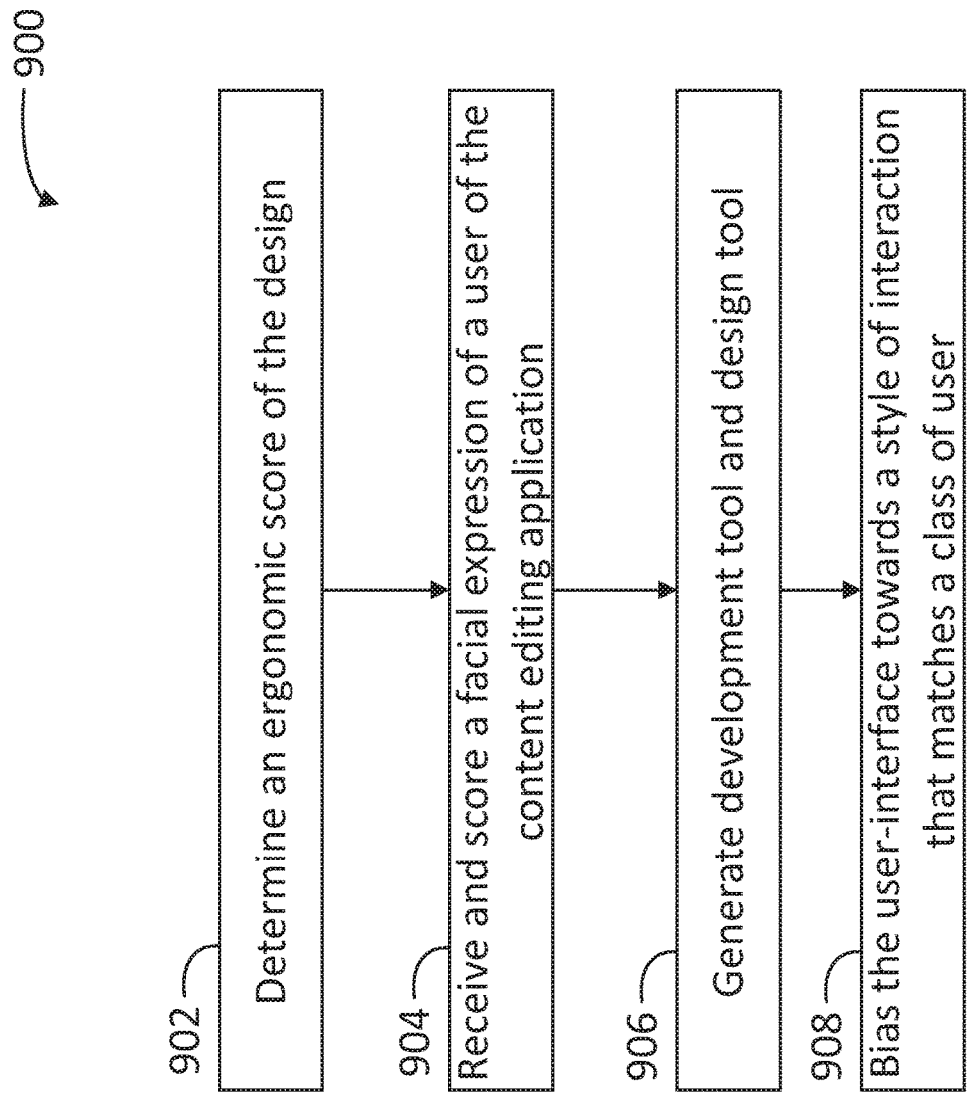
FIG. 9 is a flow chart illustrating steps in a method for creating an augmented design with a content-creating application installed in a client device, according to some embodiments.

FIG. 9 is a flow chart illustrating steps in a method 900 for creating an augmented design with a content-creating application hosted by a server, according to some embodiments. Method 900 may be performed, at least partially, by a user with any one of a plurality of client devices (e.g., any one of servers 130 and any one of client devices 110), and communicating with any one of a plurality of network servers hosting a design engine, through a communications module (e.g., design engine 242, and communications modules 218 and 238). The design engine may include a neural network, a classification log, and a design history log, and an embedded classification chart formed by the neural network (e.g., neural network 244, classification log 246, design history log 250, and embedded classification chart 300). The client devices may be handled by a user, wherein the user may be registered to a private account with the server, or may be a visitor to the server website or logged in a server application installed in the client device (e.g., application 222). Further, the client devices may include input and output devices, such as video cameras, microphones, speakers, mouse, pointers, touch screen devices, and the like (e.g., input device 214 and output device 216). At least some of the steps in method 900 may be performed by a computer having a processor executing commands stored in a memory of the computer (e.g., processors 212 and 236, memories 220 and 232). Further, steps as disclosed in method 900 may include retrieving, editing, and/or storing files in a database that is part of, or is communicably coupled to, the computer (e.g., database 252), using, inter alia, the communications module. Methods consistent with the present disclosure may include at least some, but not all of, the steps illustrated in method 900, performed in a different sequence. Furthermore, methods consistent with the present disclosure may include at least two or more steps as in method 900 performed overlapping in time, or almost simultaneously.

Step 902 includes determining an ergonomic score of a design. In some embodiments, step 902 may include retrieving video image of a designer while creating the graphic design with the application.

Step 904 includes receiving and scoring a facial expression of a user of the content editing application. In some embodiments, step 904 may include using the neural network to associate a semantic context to the facial expression of the user (e.g., "pleasure," "satisfaction," "displeasure," "annoyance," and the like).

Step 906 includes generating a development tool and a design tool based on the ergonomic score. In some embodiments, step 906 may include re-arranging graphic elements and tools in a portal of the application according to the more pleasing facial expression received from the user.

Step 908 includes biasing the user-interface towards a style of interaction that matches a class of user. In some embodiments, step 908 may include classifying the user with the neural network based on the facial expression received from the user.

Hardware Overview

Figure 10:
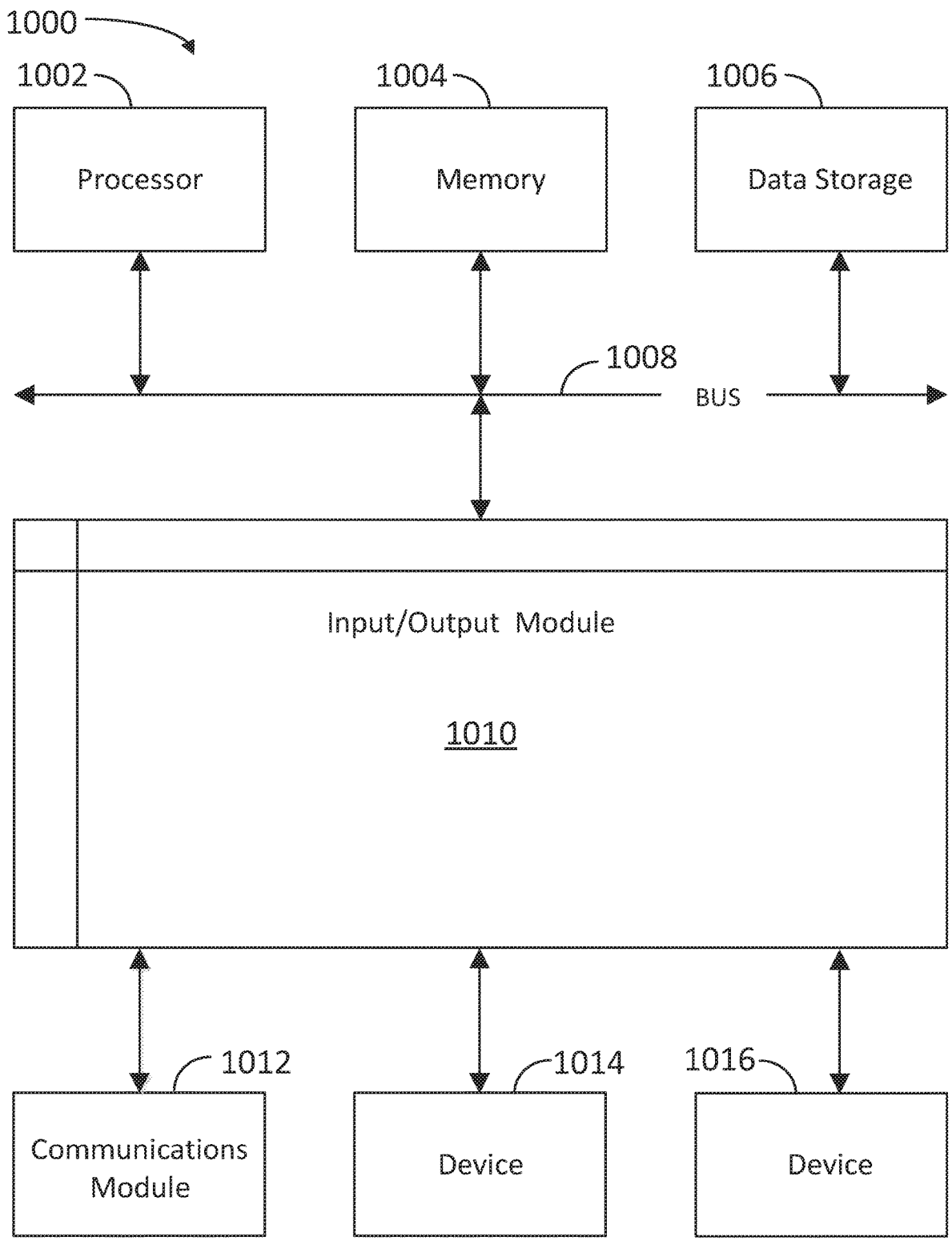
FIG. 10 is a block diagram illustrating an example computer system with which the client and server of FIGS. 1 and 2 and the methods of FIGS. 5 and 7-9 can be implemented.

FIG. 10 is a block diagram illustrating an exemplary computer system 1000 with which the client device 110 and server 130 of FIGS. 1 and 2, and the methods of FIGS. 5, 7, 8 and 9 can be implemented. In certain aspects, the computer system 1000 may be implemented using hardware or a combination of software and hardware, either in a dedicated server, or integrated into another entity, or distributed across multiple entities.

Computer system 1000 (e.g., client device 110 and server 130) includes a bus 1008 or other communication mechanism for communicating information, and a processor 1002 (e.g., processors 212 and 236) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 (e.g., communications modules 218 and 238) include networking interface cards, such as Ethernet cards and modems. In certain aspects, input/output module 1010 is configured to connect to a plurality of devices, such as an input device 1014 (e.g., input device 214) and/or an output device 1016 (e.g., output device 216). Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1016 include display devices, such as an LCD (liquid crystal display) monitor, for displaying information to the user.

According to one aspect of the present disclosure, the client device 110 and server 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   providing a design template in a computer design application for a user in a client device;
   receiving, from a selection feature in a display in the client device, a user selection of a first design type, a second design type, or a combination thereof;
   assigning an initial user-design to an initial point in an embedded classification chart wherein the initial point is selected from multiple points associated with the first design type, the second design type, or the combination thereof in the embedded classification chart and a learning model;

presenting a design proposal to the user based on the first design type, the second design type, or the combination thereof in the embedded classification chart that is close to the initial point;
receiving an augmented design from the user based on the design proposal;
assigning, to the augmented design, a second point in the embedded classification chart, and storing the augmented design with a group of collected designs in a design database;
presenting a second design proposal to the user based on the augmented design;
receiving a final user-design from the user; and
storing the final user-design in the design database.

2. The computer-implemented method of claim 1, further comprising adjusting the embedded classification chart based on the final user-design in the design database.

3. The computer-implemented method of claim 1, wherein the learning model is a semi-supervised learning model, the computer-implemented method further comprising determining at least one of multiple coordinates of the initial point according to a pre-selected design outcome.

4. The computer-implemented method of claim 1, wherein the learning model is an unsupervised learning model, the computer-implemented method further comprising determining at least one of multiple coordinates of the initial point according to a classification of multiple prior designs stored in the design database.

5. The computer-implemented method of claim 1, wherein assigning an initial user design to an initial point in an embedded classification comprises extracting a semantic information from a user input in the initial user-design, wherein the user input includes one of a text input, a voice command, or a gesture in an input device coupled with the client device.

6. The computer-implemented method of claim 1, wherein assigning the initial user design to an initial point in an embedded classification chart further comprising identifying design elements based on a semantic information extracted from the initial user-design and a content in the initial user-design.

7. The computer-implemented method of claim 1, wherein presenting a first design proposal to the user comprises presenting a design proposal from a subclass of the first design type in the embedded classification chart.

8. The computer-implemented method of claim 1, wherein the second design type is selected based on the augmented design from the user and presenting a second design proposal comprises selecting a design proposal from a subclass of the second design type in the embedded classification chart.

9. The computer-implemented method of claim 1, further comprising defining a classification type for the embedded classification chart based on a personalized design style, and presenting the design proposal to the user comprises receiving, from the user, a desired bias of the design proposal towards the personalized design style.

10. The computer-implemented method of claim 1, wherein presenting the design proposal comprises re-arranging design elements within a page in the initial user-design, based on a constraint and a context, wherein the constraint is imposed by a rule in the embedded classification chart, and the context comprises a relative location of the initial point with respect to the first design type and the second design type, in the embedded classification chart.

11. A system, comprising:
a memory storing multiple instructions; and
one or more processors configured to execute at least one instruction to:
provide a design template in a computer design application for a user in a client device;
receive, from a selection feature in a display in the client device, a user selection of a first design type, a second design type, or a combination thereof;
assign an initial user-design to an initial point in an embedded classification chart based on the first design type, the second design type, or the combination thereof in the embedded classification chart, and a learning model;
present a design proposal to the user based on the first design type in the embedded classification chart that is close to the initial point;
receive an augmented design from the user based on the design proposal; assign, to the augmented design, a second point in the embedded classification chart, and store the augmented design with a group of collected designs in a design database;
present a second design proposal to the user based on the augmented design;
receive a final user-design from the user; and
store the final user-design in the design database.

12. The system of claim 11, wherein the learning model is a semi-supervised learning model stored in the memory, including instructions to determine at least one of multiple coordinates of the initial point according to a pre-selected design outcome.

13. The system of claim 11, wherein the learning model is an unsupervised learning model stored in the memory, including instructions to determine at least one of multiple coordinates of the initial point according to a classification of multiple prior designs stored in the design database.

14. The system of claim 11, wherein the learning model comprises a statistical data collected for multiple users over an extended period of time, and a heat map overlay on the design template, the heat map overlay indicative of an area in the design template where a user is likely to be active.

15. The system of claim 11, wherein the learning model is stored in the memory, including instructions to identify design features associated to the first design type and the second design type, the design features comprising a color pattern, a shape proportion, and a placement frequency of a design object.

16. The system of claim 11, wherein the design database is part of the memory, and wherein the memory further comprises a classification log configured to store multiple, personalized design styles for a user selection.

17. The system of claim 11, further comprising a communications module configured to communicate with the design database through a network to store the augmented design and the final user-design in the design database.

18. A non-transitory, computer-readable medium storing instructions which, when executed by a processor, cause a computer to perform a method, the method comprising:
providing a design template in a computer design application for a user in a client device;
receiving, from a selection feature in a display in the client device, a user selection of a first design type, a second design type, or a combination thereof;
assigning an initial user-design to an initial point in an embedded classification chart wherein the initial point is selected from multiple points associated with first design type, the second design type, or the combination thereof in the embedded classification chart and a learning model;

presenting a design proposal to the user based on the first design type, the second design type or the combination thereof in the embedded classification chart that is close to the initial point;

receiving an augmented design from the user based on the design proposal;

assigning, to the augmented design, a second point in the embedded classification chart, and storing the augmented design with a group of collected designs in a design database;

presenting a second design proposal to the user based on the augmented design;

receiving a final user-design from the user; and storing the final user-design in the design database.

19. The non-transitory, computer-readable medium of claim 18, wherein the learning model is a semi-supervised learning model, the method further comprising determining at least one of multiple coordinates of the initial point according to a pre-selected design outcome.

20. The non-transitory, computer-readable medium of claim 18, wherein the learning model is an unsupervised learning model, the method further comprising determining at least one of multiple coordinates of the initial point according to a classification of multiple prior designs stored in the design database.

* * * * *